United States Patent
Bedard et al.

(10) Patent No.: US 7,121,370 B2
(45) Date of Patent: Oct. 17, 2006

(54) LATCH

(75) Inventors: Yvon Bedard, Orford (CA);
Jean-François Desmarais, Racine (CA)

(73) Assignee: Bombardier Recreational Products Inc., Valcourt (CA)

( * ) Notice: Subject to any disclaimer, the term of this patent is extended or adjusted under 35 U.S.C. 154(b) by 260 days.

(21) Appl. No.: 10/724,200

(22) Filed: Dec. 1, 2003

(65) Prior Publication Data
US 2004/0108153 A1  Jun. 10, 2004

Related U.S. Application Data

(60) Provisional application No. 60/430,097, filed on Dec. 2, 2002.

(51) Int. Cl.
*B62D 25/12* (2006.01)
*E05C 19/00* (2006.01)

(52) U.S. Cl. .................... 180/69.2; 180/184

(58) Field of Classification Search ........... 180/184, 180/182, 69.2, 69.21, 69.24; 296/193.11, 296/190.06, 192; 292/253, DIG. 1, DIG. 3, 292/DIG. 14
See application file for complete search history.

(56) References Cited

U.S. PATENT DOCUMENTS

| | | | | |
|---|---|---|---|---|
| 1,047,679 A * | 12/1912 | Miller | .............. | 70/240 |
| 2,833,365 A * | 5/1958 | Kesl et al. | .............. | 180/69.24 |
| 3,528,520 A * | 9/1970 | Aaron | .............. | 296/63 |
| 3,633,390 A * | 1/1972 | Wartian | .............. | 70/240 |
| 3,688,856 A * | 9/1972 | Boehm et al. | .............. | 180/190 |
| 4,801,165 A * | 1/1989 | Pyle | .............. | 292/249 |
| 5,634,525 A * | 6/1997 | Templeton et al. | .............. | 180/69.24 |
| 5,806,620 A * | 9/1998 | DeRees et al. | .............. | 180/69.21 |
| 6,345,846 B1 * | 2/2002 | DeRees et al. | .............. | 292/241 |
| 6,626,256 B1 * | 9/2003 | Dennison et al. | .............. | 180/69.24 |
| 6,666,291 B1 * | 12/2003 | Hyslop et al. | .............. | 180/69.21 |
| 2002/0053804 A1 * | 5/2002 | Desmarais et al. | .............. | 292/246 |

* cited by examiner

*Primary Examiner*—Frank Vanaman
(74) *Attorney, Agent, or Firm*—Osler, Hoskin & Harcourt LLP

(57) ABSTRACT

A snowmobile includes a pivotally mounted motor cover that moves between open and closed positions relative to the snowmobile's frame. A latch fastener selectively secures the motor cover in its closed position. The latch fastener includes a pin that is rigidly mounted to the frame and positioned such that the pin extends through an opening in the motor cover when the motor cover is in the closed position. A resilient latch mounts to the frame and selectively engages the pin to hold the motor cover in the closed position. When the motor cover is in the closed position, the pin engages the peripheral edge of the opening to discourage the motor cover from moving relative to the frame. The latch covers the tip of the pin to discourage clothing, debris, etc. from catching on the pin.

13 Claims, 15 Drawing Sheets

LATCH

RELATED APPLICATIONS

This application claims the benefit of priority to U.S. Provisional Patent Application Ser. No. 60/430,097 entitled "LATCH" which was filed on Dec. 2, 2002, the contents of which are incorporated herein by reference.

BACKGROUND OF THE INVENTION

1. Field of the Invention

This invention relates to a latch, and more particularly to a latch for use with a vehicle such as a snowmobile.

2. Description of Related Art

FIG. 10 is a side view of a prior art snowmobile 10. The snowmobile 10 includes a main body 15 that is supported by a frame. A rear portion of the main body 15 includes a seat 20 and a front portion of the main body includes an engine cover 25. The engine cover 25 can be removed or pivoted about a laterally extending axis to a raised position (FIG. 11) to allow access to the engine and/or other interior compartments of the snowmobile 10. Various prior art latch fasteners have been used to secure the cover 25 with respect to the main body 15.

As shown in FIG. 12, which is a partial rear perspective view of the snowmobile 10, such a latch fastener 30 may include an elastic member 35. The elastic member 35 in FIG. 12 is shown as being anchored or secured to the main body 15 of the snowmobile 10 using a fastener 40. The elastic member 35 includes an opening 45 that is intended to receive and cooperate with a hook 50 provided on the cover 25. To secure the cover 25 to the main body 15 using the latch fastener 30, the elastic member 35 is stretched until the opening 45 overcomes the hook 50, and the elastic member 35 is released such that the hook 50 is coupled to the elastic member 35, preferably under a predetermined tension. In the coupled position, the hook 50 protrudes through and out of the opening 45 such that the hook 50 remains exposed to the surrounding environment. Loose clothing or other material may therefore inadvertently become caught on the hook 50.

FIGS. 13 and 14 show an alternative prior art latch fasteners. FIG. 13 shows a lever 55 that is pivotably connected to the main body 15 of the snowmobile 10. The cover 25 includes a receptacle 60 with a slot 65 that is sized to receive the lever 55. A square protrusion 70 on the lever 55 fits within the slot 65 when the lever 55 is pivoted into the locking position, as shown in FIG. 14. The lever 55 can be pivoted using a knob 75. When the lever 55 is in the locking position, the entire locking force of the latch fastener is transferred through the lever 55. This locking force stresses and strains the lever 55.

FIGS. 15A–16 show yet another prior art latch fastener. The latch fastener includes a latch 76 (FIG. 15A) provided on cover 77 that can be used to releasably connect the cover 77 to a hook 78 (FIG. 15B) provided on a main body 79 of the snowmobile. The latch 76 is pivotably mounted on a support bracket 80, which is mounted to a base 81 connected to the cover 77. The latch 76 is shown in the open position in FIG. 15A, with a pair of arms 82 extending away from the latch 76. The arms 81 include springs and are connected by a cross member 83.

When the cover 77 is closed, the cross member 83 is coupled to the hook 78 on the main body 79 (FIG. 15B). After reaching this position, the latch 76 is pivoted downwardly toward the base 81, such that the cover 77 and main body 79 are secured to one another. This secured position is shown in FIG. 16. A pair of upstanding flanges 84 are aligned with the tab portion of the latch 76. The flanges 84 include through openings 85 that can accommodate a locking pin (not shown) to maintain the latch 76 in the closed position shown in FIG. 16.

These prior at latch fasteners have drawbacks. For example, these latch fasteners can require a great deal of strength or space to operate. Also, the designs can be overly complicated and expensive, and they can require additional parts to keep them in stable open and closed positions. Hooks and other protruding parts of several of these latch fasteners may also inadvertently catch clothing and other materials (e.g., twigs, small branches, debris, etc.). Furthermore, resilient portions of several of these latch fasteners must bear significant portions of the forces exerted on the latch fastener by the motor cover.

SUMMARY OF THE INVENTION

It is one aspect of one or more embodiments of the invention, therefore, to avoid the main drawbacks of the related art by providing a snowmobile with an improved latch fastener that is easy to assemble and manufacture.

Another aspect of one or more embodiments of the present invention provides a lightweight and durable latch fastener that can be reliably secured in the open and closed positions with little effort.

Another aspect of one or more embodiments of the present invention provides a snowmobile that includes a frame, a motor supported by the frame, an endless drive track supported by the frame and operatively connected to the motor, a straddle type seat supported by the frame, and two steering skis supported by the frame. The snowmobile also includes a motor cover connected to the frame for relative pivotal movement about a motor cover axis between a closed position and an open position relative to the frame. The motor cover defines an opening therethrough with a peripheral edge. The snowmobile further includes a pin rigidly mounted to the frame and positioned such that the pin extends through the opening when the motor cover is in the closed position. The snowmobile further includes a latch having a first portion mounted to the frame and a second portion selectively engageable with the pin. When engaged, the second portion holds the motor cover in the closed position. When the motor cover is in the closed position, the pin engages the peripheral edge of the opening to discourage the motor cover from moving relative to the frame.

According to a further aspect of one or more of these embodiments, the latch includes a resilient portion connecting the first portion to the second portion. The pin may include a first portion that extends outwardly from the frame and a second portion that protrudes from the first portion so that the first and second portions generally form an "L" shape. The second portion of the latch may include a lip that selectively engages the second portion of the pin. The latch may further include a knob attached to the second portion. The knob is constructed and arranged to enable a rider to selectively engage the latch and pin by manipulating the knob so as to stretch the resilient portion of the latch and enable the lip of the latch to fit over the second portion of the pin.

According to a further aspect of one or more of these embodiments, the motor cover includes a recessed area around the opening such that the second portion of the latch is disposed in the recessed area when the motor cover is closed and the latch engages the pin.

According to a further aspect of one or more of these embodiments, the motor cover axis forms an angle with a vertically extending line that is less than 45 degrees. The motor cover may include a knee rest that is constructed and arranged to engage one of the snowmobile rider's knees during operation of the snowmobile. The snowmobile is constructed and arranged to transfer forces exerted by the rider's knee on the motor cover to the frame through the pin.

According to a further aspect of one or more of these embodiments, the latch encloses a distal end of the pin when the latch engages the pin.

According to a further aspect of one or more of these embodiments, the snowmobile also includes a starter cord and handle operatively connected to the motor. The motor cover includes a second opening therethrough, through which the handle extends when the motor cover is in the closed position.

According to a further aspect of one or more of these embodiments, when the motor cover is in the open position, the motor is exposed.

According to a further aspect of one or more of these embodiments, the pin extends outwardly from the frame in a direction that defines a pin axis. When the motor cover is in the closed position, forces applied to the motor cover in a direction perpendicular to the pin axis are transferred to the frame through the pin.

Additional and/or alternative aspects, features, advantages, and objects of one or more embodiments of the present invention will be described in or apparent from the following detailed description of preferred embodiments.

BRIEF DESCRIPTION OF THE DRAWINGS

Preferred embodiments of the invention will be described in conjunction with the following drawings, wherein.

DETAILED DESCRIPTION OF PREFERRED EMBODIMENTS

Figure 1:
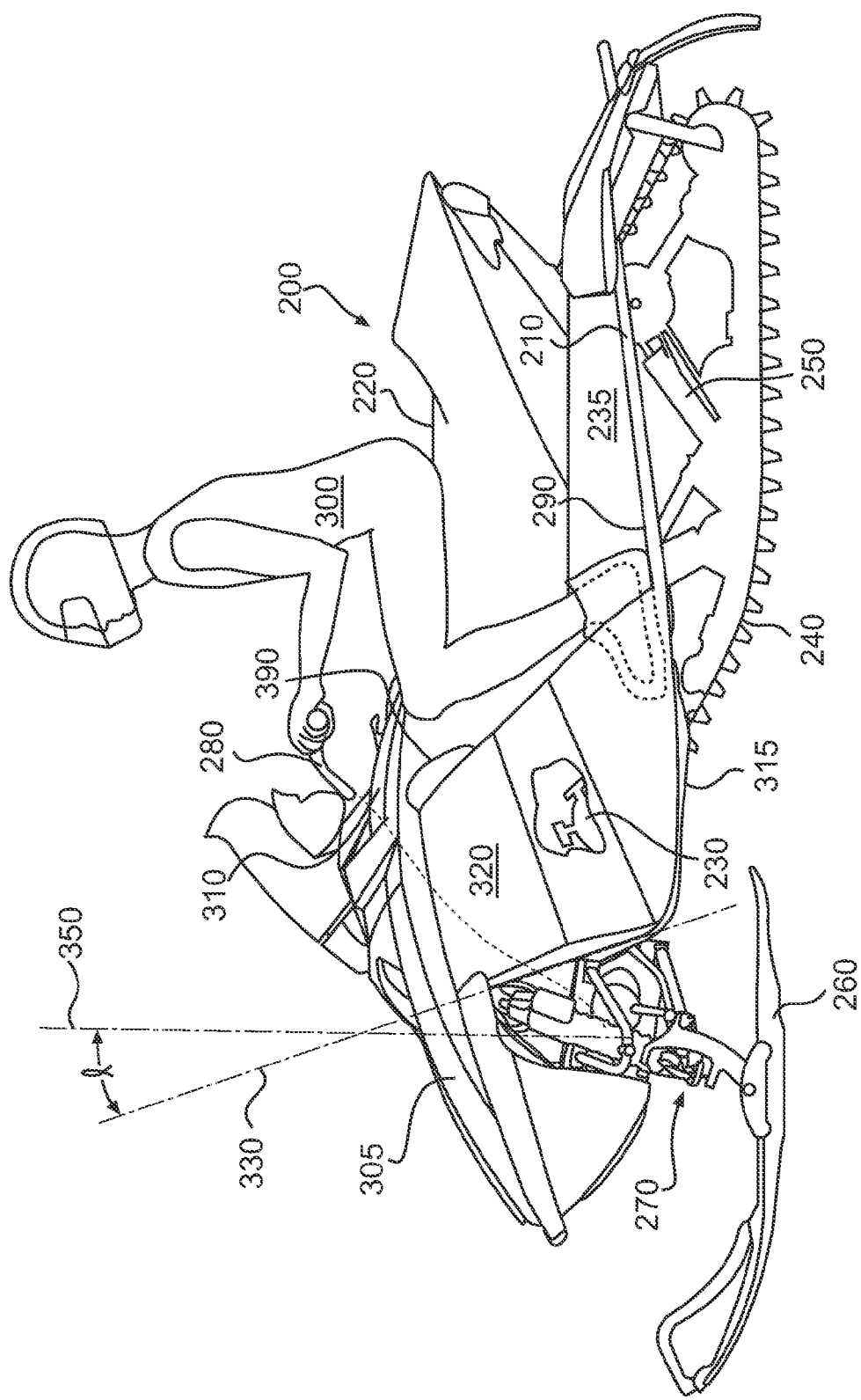
FIG. 1 is a left side view of a snowmobile according to one embodiment of the present invention.

FIG. 1 is a side view of a snowmobile 200 according to one embodiment of the present invention. The snowmobile 200 includes a frame 210. A straddle type seat 220 is constructed and arranged to support a rider 300 and is supported by the frame 210. A motor 230 (such as a two or four stroke internal combustion engine) is supported by the frame 210. The frame 210 includes a tunnel 235, which preferably comprises one or more pieces of bent sheet metal that form an inverted channel. An endless drive track 240 is disposed partially within the channel formed by the tunnel 235 and is supported by the tunnel 235 through a rear suspension system 250 (such as a slide rail suspension system). The endless drive track 240 operatively connects to the motor 230 to propel the snowmobile 200. Two steering skis 260 are supported by the frame 210 through a front suspension system 270 (such as a double A-arm suspension system or a pusher arm suspension system). The steering skis 260 operatively connect to a steering device 280 such as a handlebar or steering wheel. The tunnel 235 supports a footrest 290 that is constructed to support the feet of the snowmobile rider 300.

As shown in FIG. 1, a front fairing 305 and a control console 310 enclose and protect an upper side of the motor 230. The fairing 305 is preferably rigidly mounted to the frame 210, but may alternatively be removably mounted to the frame 210 so as to enable easy access to the top of the motor 230. A motor pan 315 is mounted to the frame 210 below the motor 230 to protect and enclose the underside of the motor 230.

Figure 2:
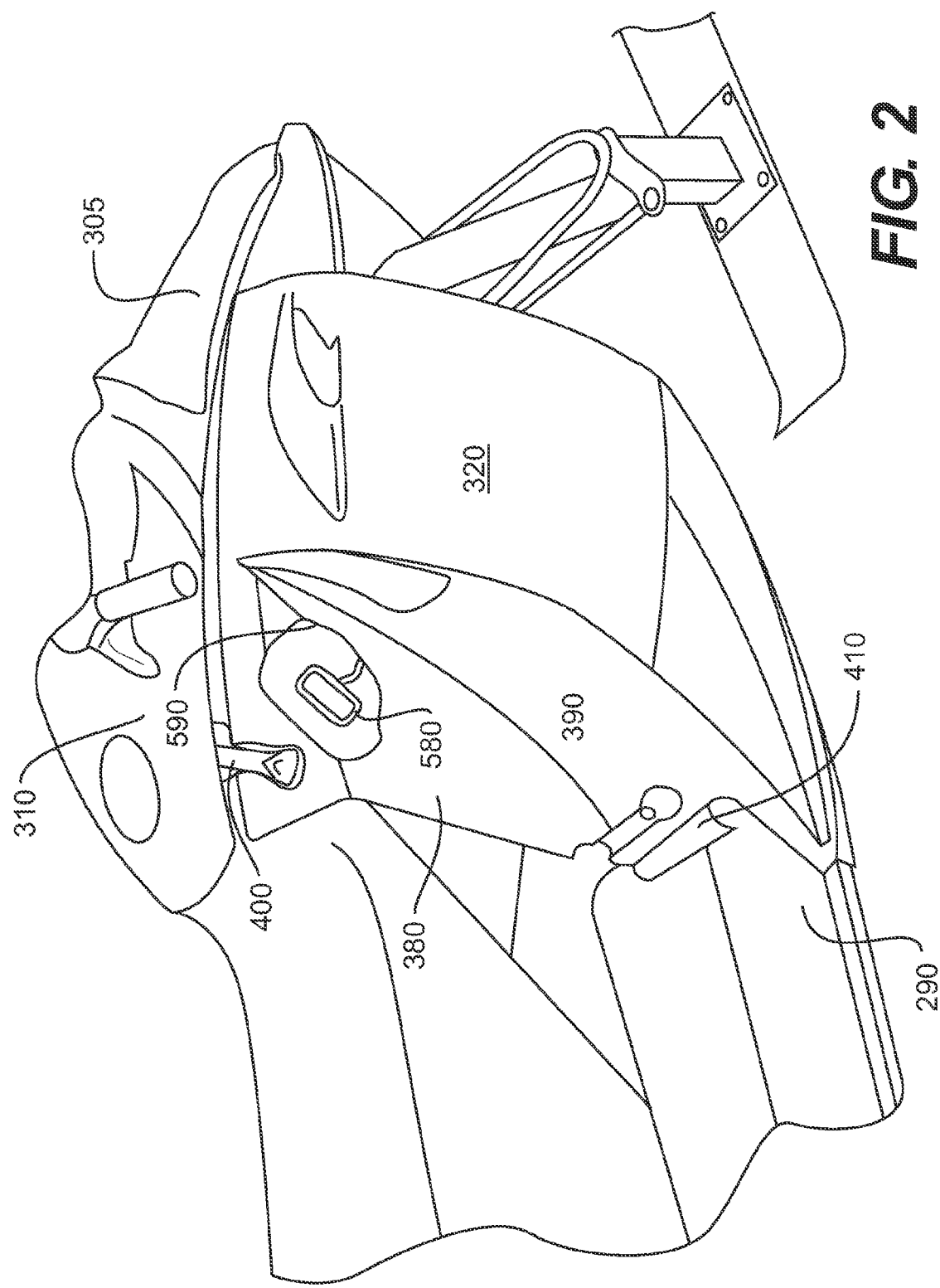
FIG. 2 is a partial, right, side, perspective view of the snowmobile shown in FIG. 1.
Figure 3:
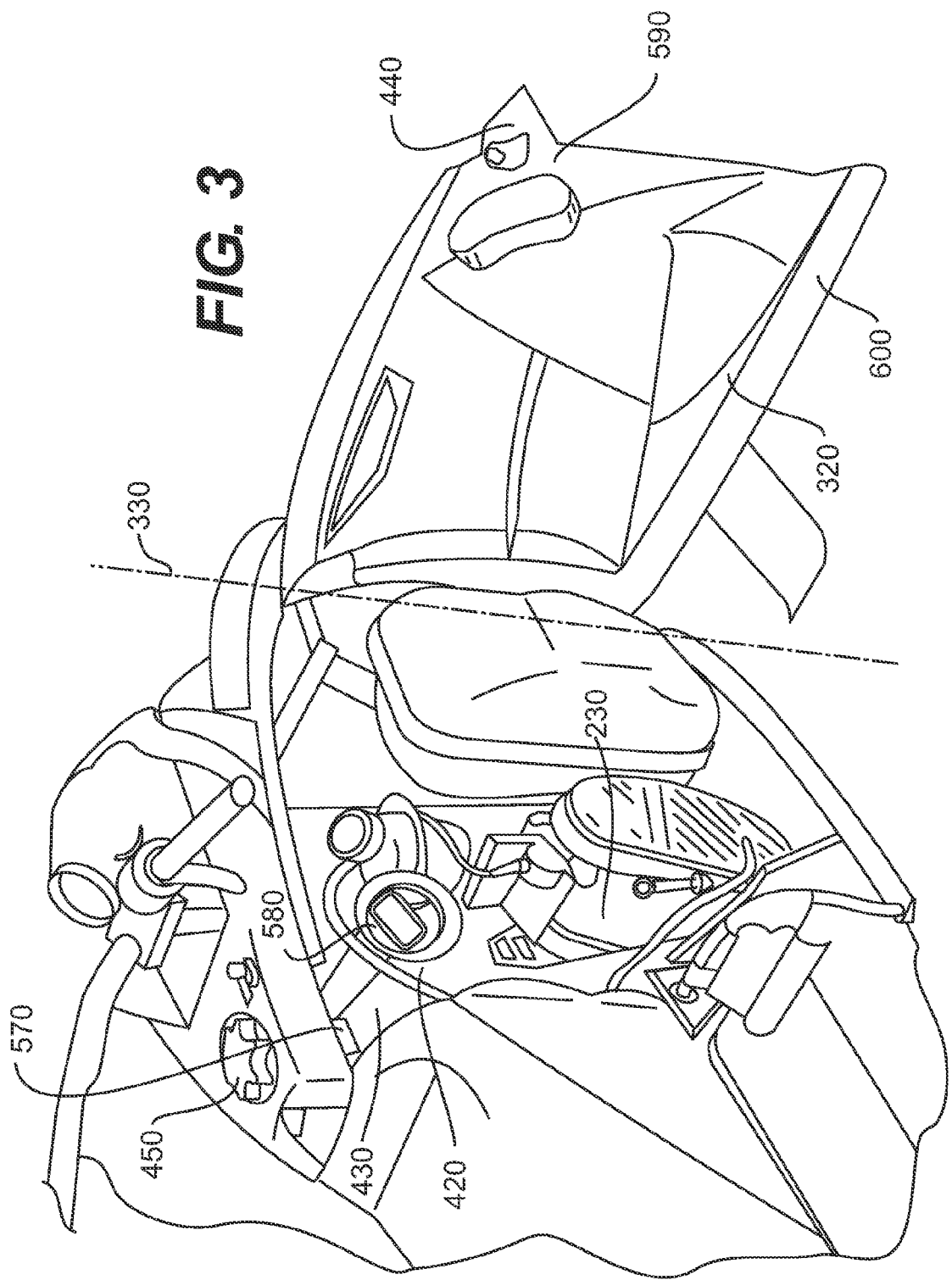
FIG. 3 is a partial, right, side, perspective view of the snowmobile shown in FIG. 1 with a right motor cover in an open position.

As shown in FIGS. 1–3, right and left motor covers 320 pivotally connect to the frame 210 at motor cover pivot axes 330 such that each of the motor covers 320 have open and closed positions relative to the frame 210. Because the left and right motor covers 320 are generally mirror images of each other, only the right motor cover 320 is described in detail. It is to be understood, however, that aside from the noted exceptions, the description of the left motor cover 320 also applies to the right motor cover 320.

As shown in FIGS. 1 and 2, when the motor cover 320 is closed, it encloses and protects a lateral side of the motor 230. An upper edge of the motor cover 320 preferably mates with a side edge of the fairing 305 and/or console 310. Similarly, a lower edge of the motor cover 320 preferably mates with a side edge of the motor pan 315. Consequently, when the motor covers 320 are closed, the motor covers 320, motor pan 325, console 310, and fairing 305 protect and enclose the motor 230. Conversely, as illustrated in FIG. 3, when the motor cover 320 is opened, a lateral side of the motor 230 and other snowmobile 200 components are exposed and accessible.

As shown in FIG. 1, to enable the motor cover 320 to swing generally horizontally between its open and closed positions, the motor cover pivot axis 330 preferably extends in a generally vertical direction. Accordingly, an angle a formed between the motor cover pivot axis 330 and a vertically extending line 350 is preferably less than 45 degrees and is more preferably less than 30 degrees.

Figure 10:
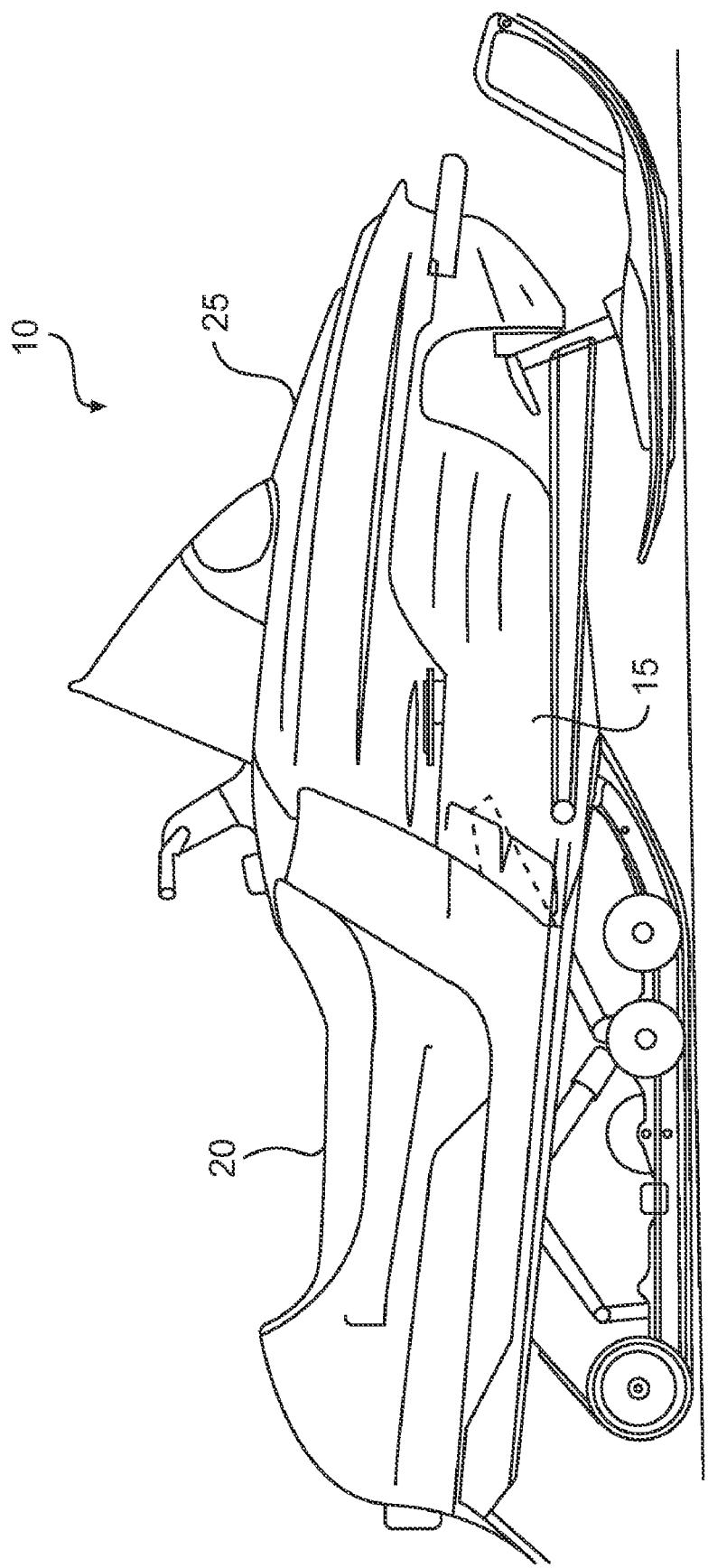
FIG. 10 is a side view of a snowmobile according to the prior art.
Figure 11:
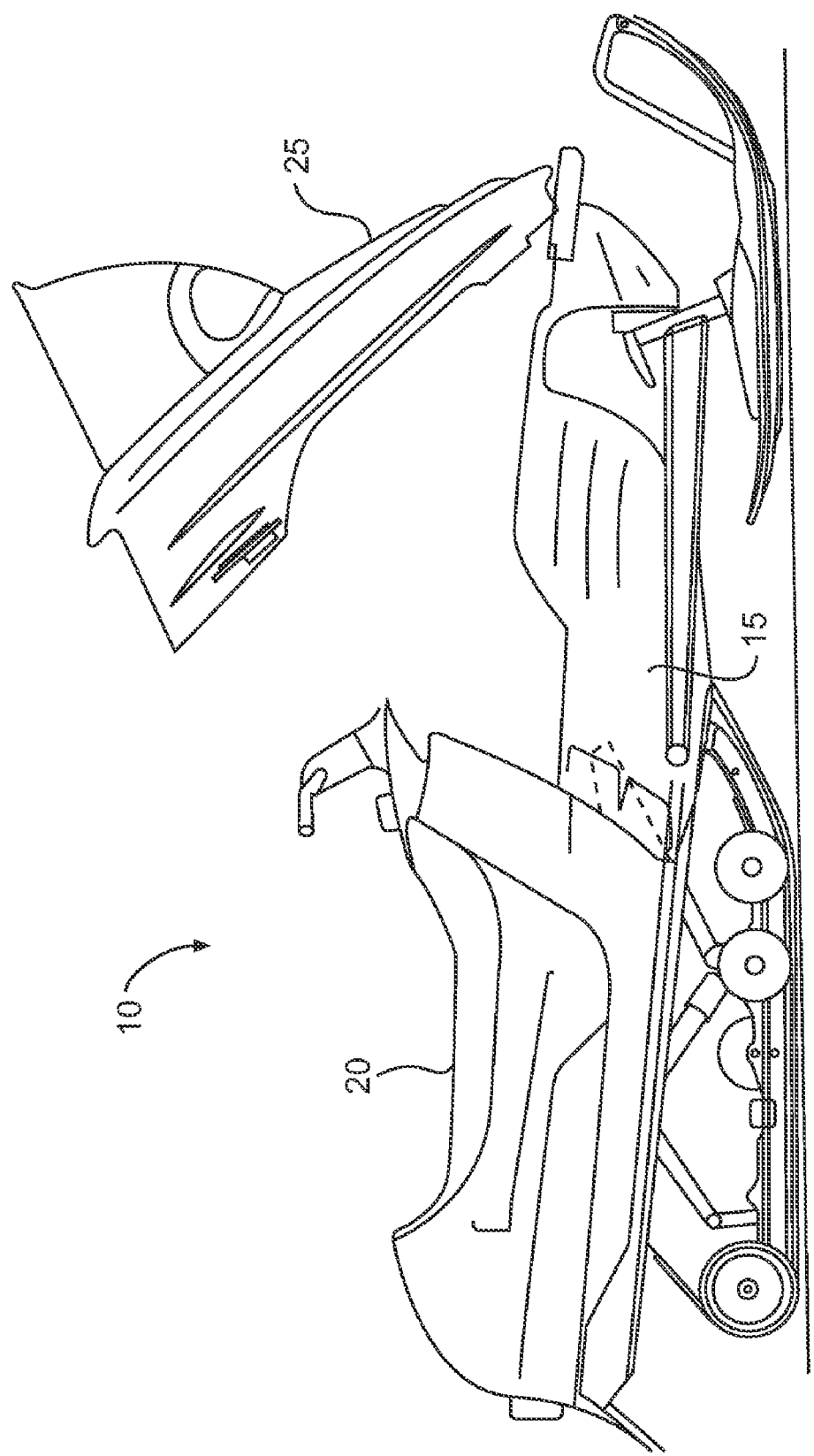
FIG. 11 is a side view of the snowmobile shown in FIG. 10, with the engine cover in an open position.
Figure 12:
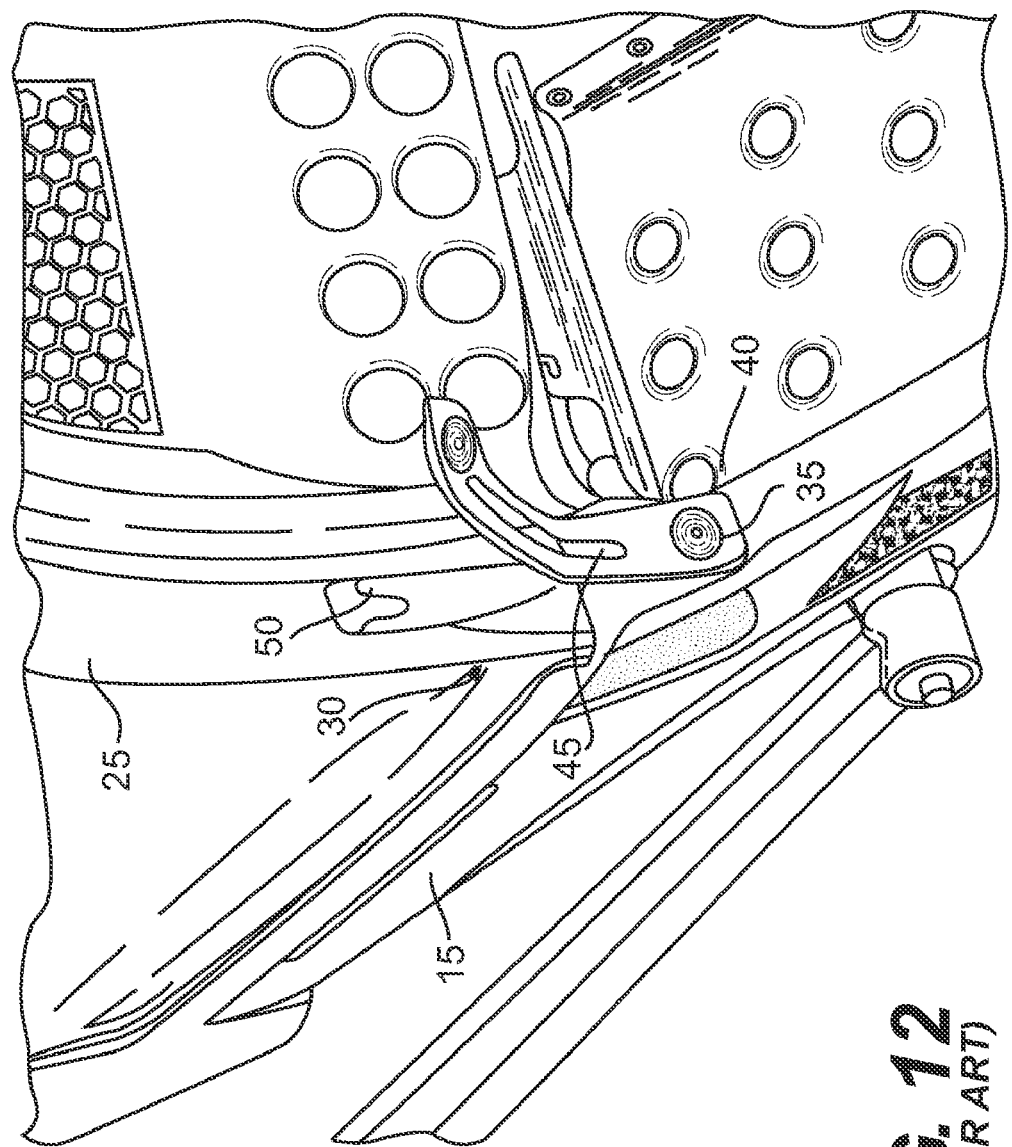
FIGS. 12–16 illustrate other engine cover latch fasteners for snowmobiles according to the prior art.
Figure 13:
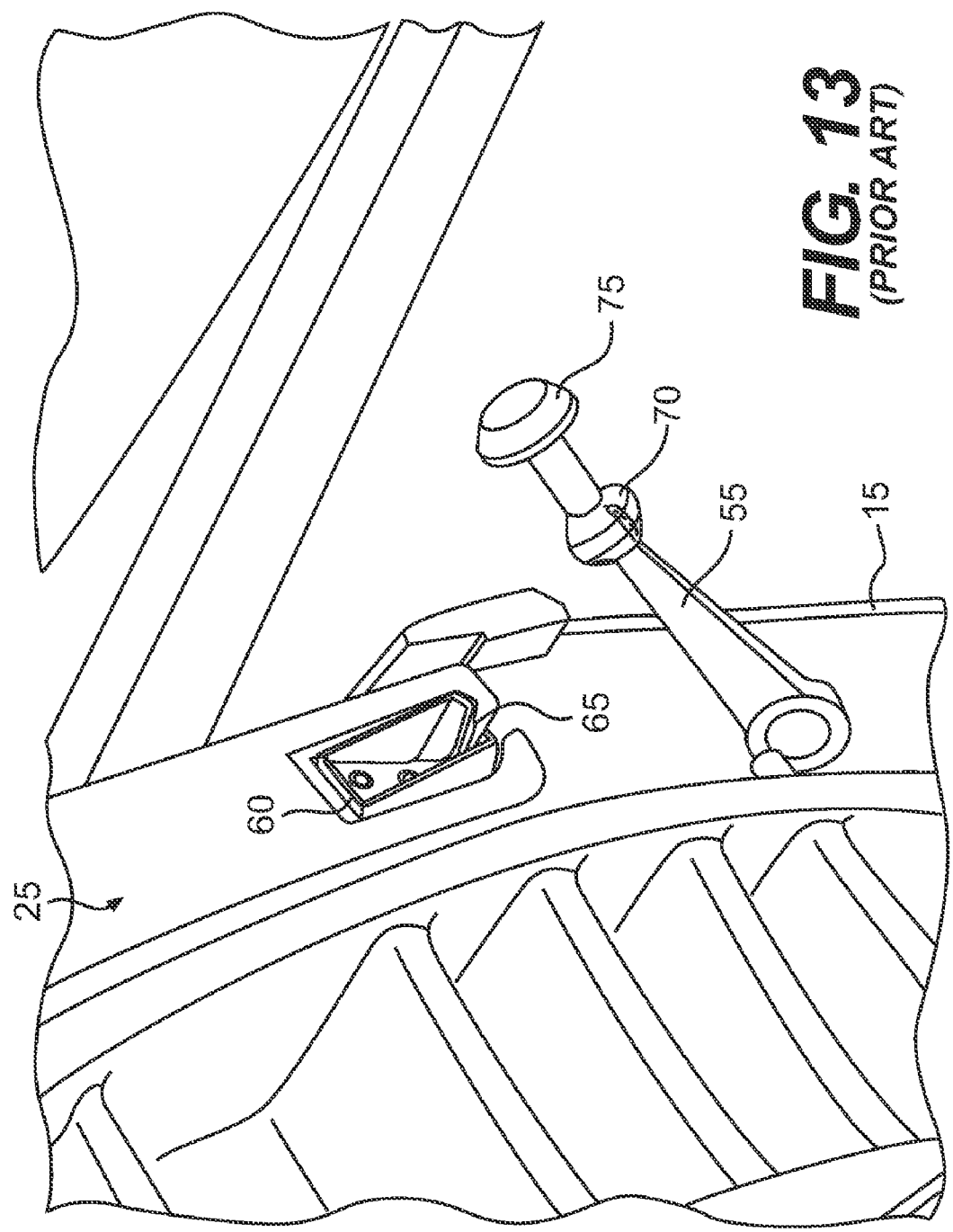
Figure 14:
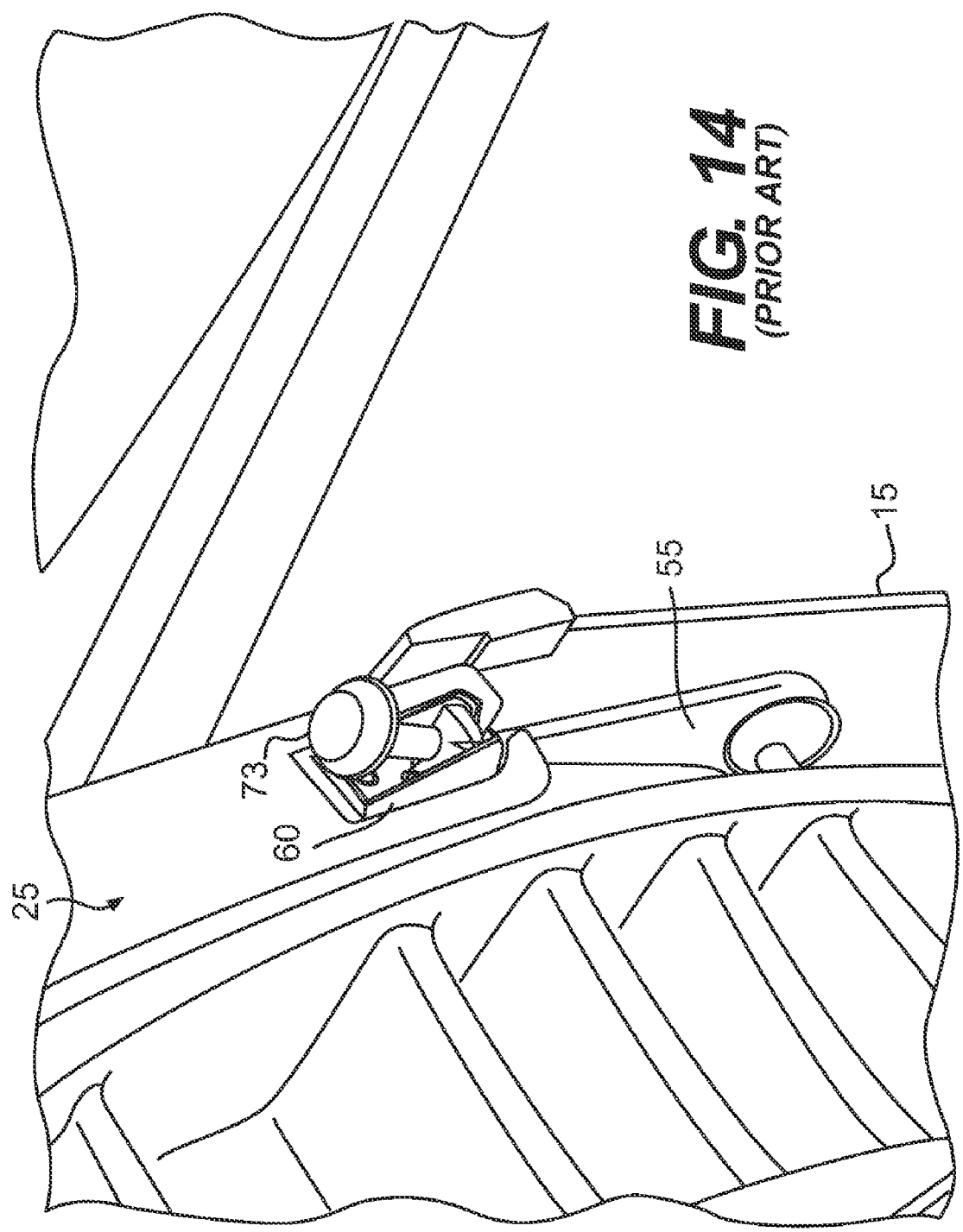
Figure 15A:
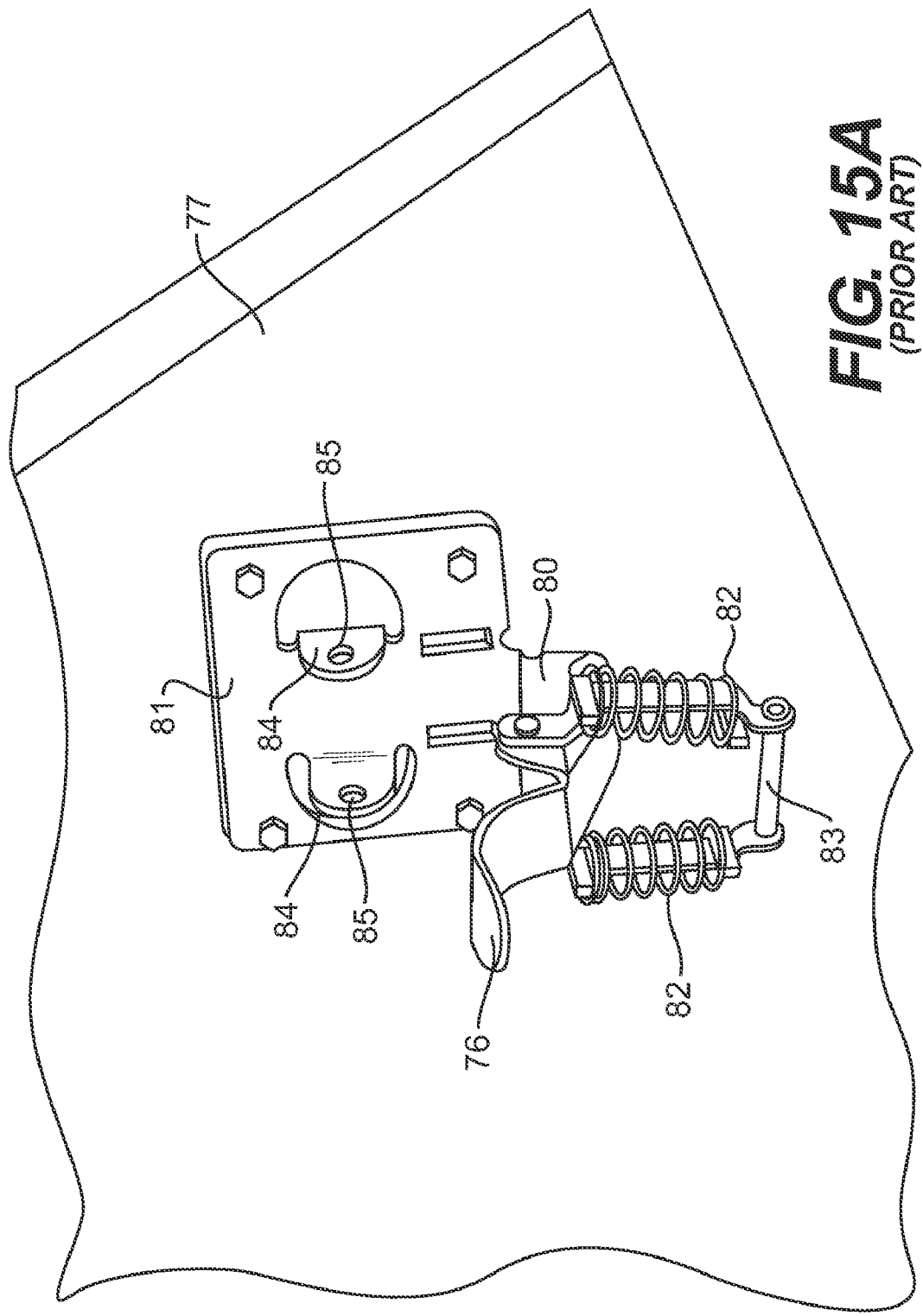
Figure 15B:
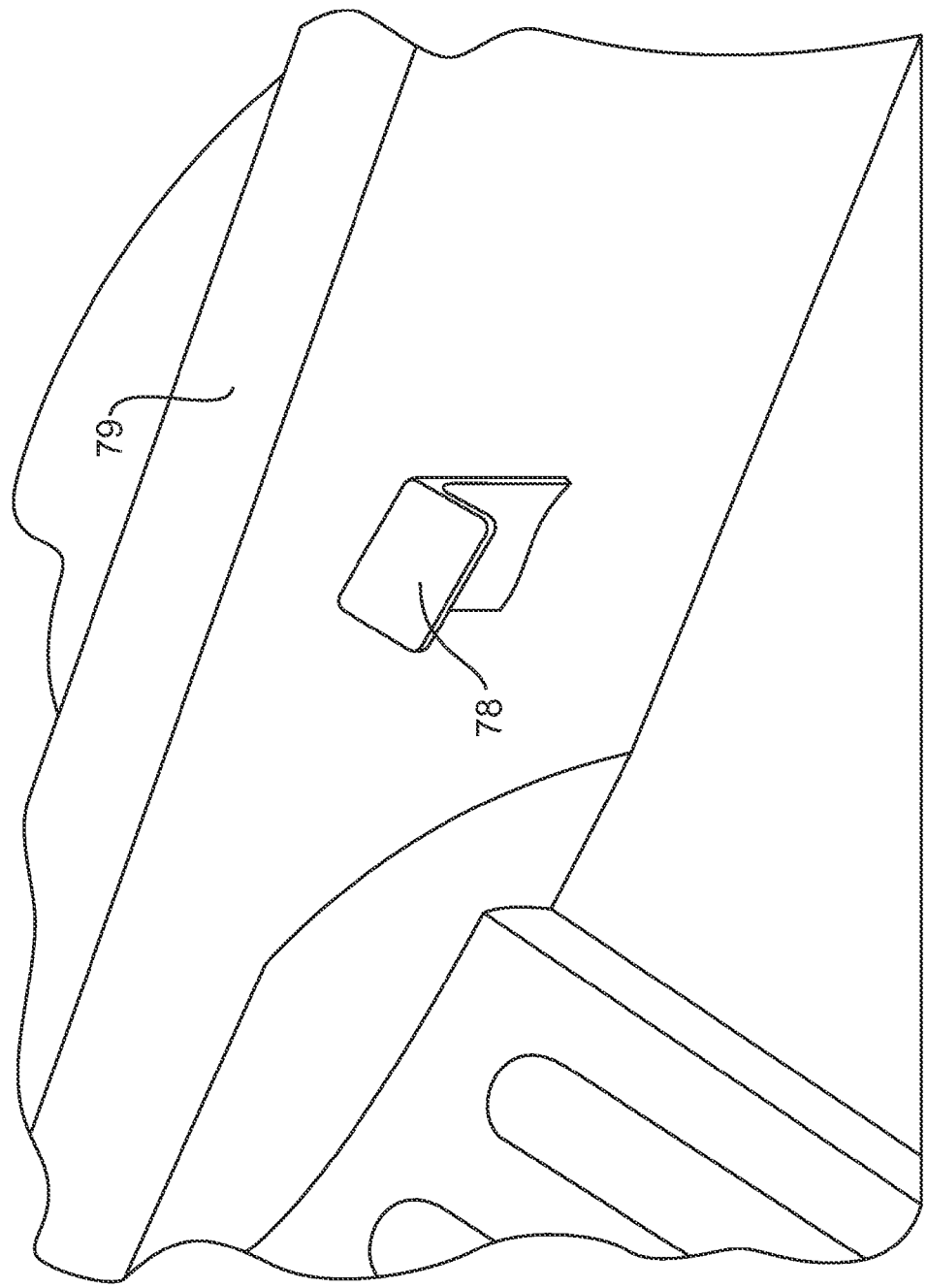
Figure 16:
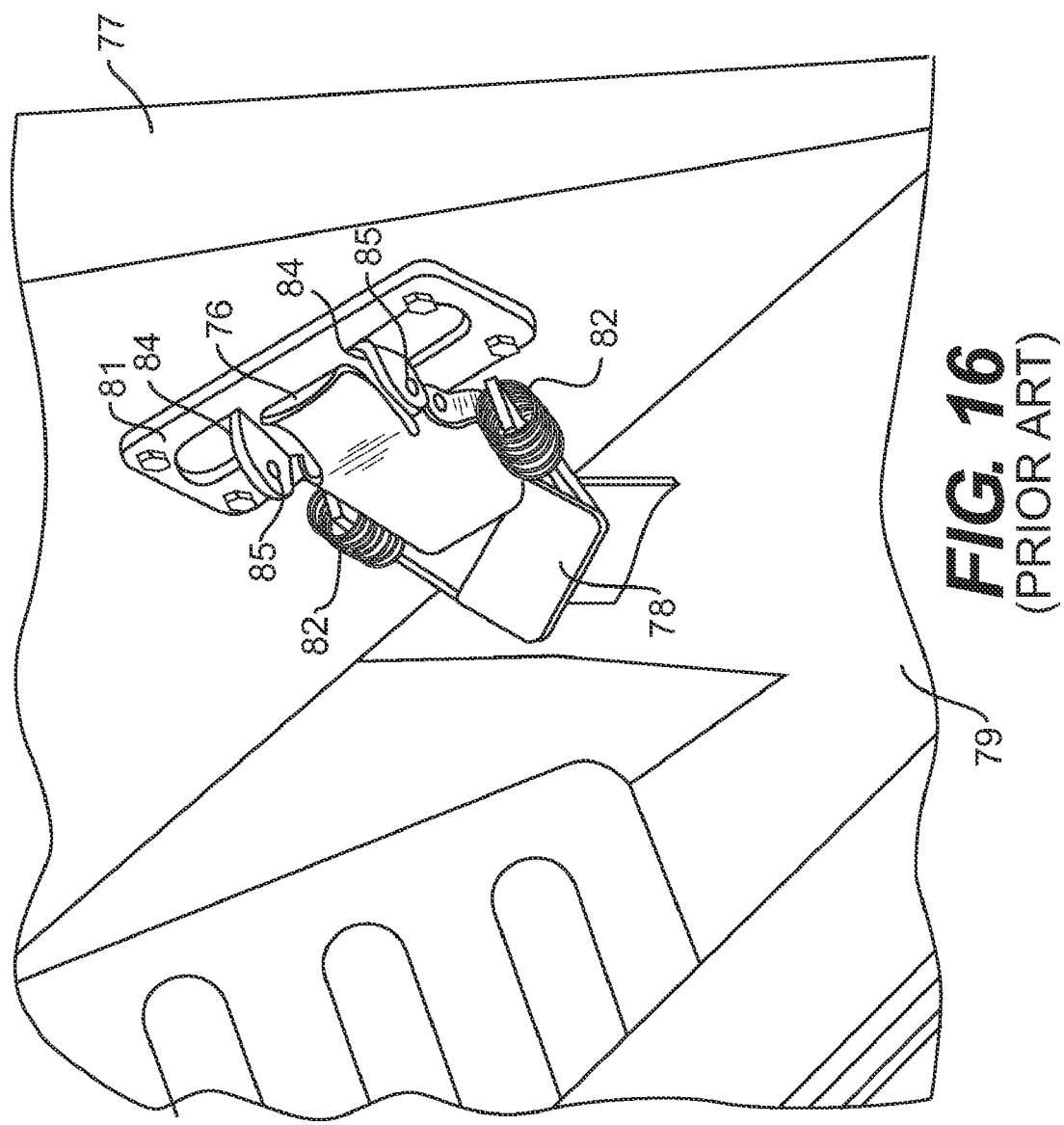

Elements of the snowmobile 200 (such as, for example, the seat 220, frame 210, footrest 290, and steering device 280) are preferably positioned relative to each other so that the snowmobile rider 300 who is sitting on the seat 220 in a standard riding position is positioned farther forward on the snowmobile 200 than a snowmobile rider is on the conventional snowmobile 10 (FIG. 10). Furthermore, the rider 300 is preferably positioned in a more active riding position that improves the rider's ability to raise and lower himself using his legs, absorb bumps, and lean into turns.

To enhance the rider's comfort and ability to actively position himself, the motor cover 320 includes a knee rest surface 390. The rider 300 may move forward relative to his position in FIG. 1 in order to engage the knee rest surface 390 with his knee. Forces exerted by the rider's knees on the motor cover 320 are transferred to the frame 210 to ensure that the motor cover 320 can handle the rider's knee forces.

As illustrated in FIG. 2, the snowmobile 200 includes upper and lower latch fasteners 400, 410 that selectively hold the motor cover 320 in its closed position against the frame 210 of the snowmobile 200. The lower latch fastener 410 may comprise any type of latch fastener. For example, the lower latch fastener may comprise any of the conventional latch fasteners described above. Alternatively, the lower latch fastener 410 may be omitted altogether. Furthermore, additional latch fasteners may be added to further strengthen the connection between the motor cover 320 and the frame 210.

As shown in FIGS. 4–9, the upper latch fastener 400 comprises three main components: a pin 420 that rigidly mounts to the frame 210, a latch 430 that mounts to the frame 210 and selectively engages the pin 420, and an opening 440 formed in the motor cover 320.

As illustrated in FIGS. 4 and 7–9, the pin 420 rigidly mounts to a portion 450 of the frame 210. The frame portion 450 may be an existing structural element of the frame 210 or may be an element that is specifically attached to the remainder of the frame 210 to create a base for the upper latch fastener 400. The pin 420 and frame portion 450 preferably comprise a strong light material such as aluminum. The pin 420 and frame portion 450 may be integrally formed. Alternatively, the pin 420 may be rigidly fixed to the separately formed frame portion 450. In such an embodiment, the pin 420 is preferably welded, brazed, glued, bolted, screwed or otherwise rigidly attached to the frame portion 450.

Figure 7:
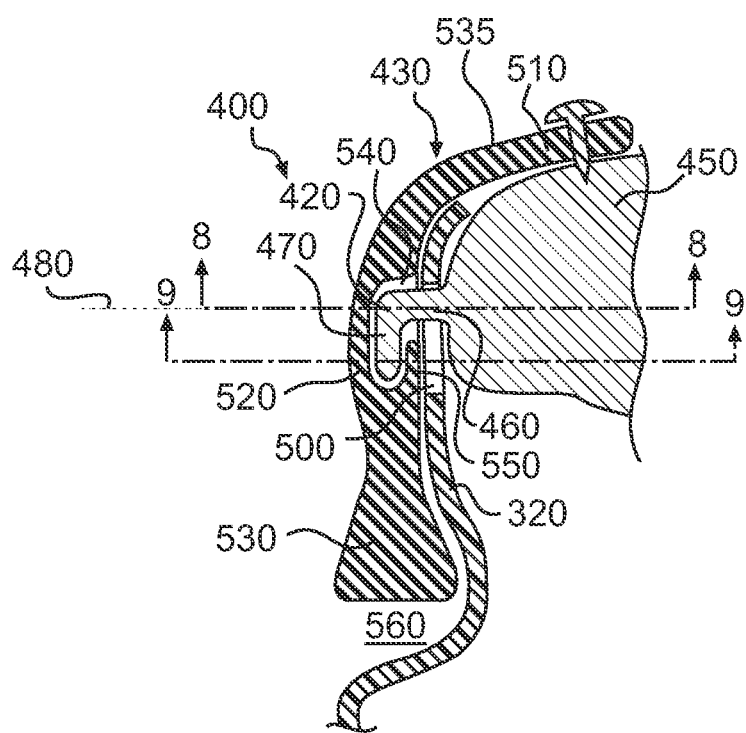
FIG. 7 is a cross-sectional view of the latch fastener shown in FIG. 6, taken along the line 7—7 in FIG. 6.

As shown in FIG. 7, the pin 420 comprises a base portion 460 and a tip (or distal) portion 470. The base portion 460 extends outwardly from the frame portion 450 and defines a pin axis 480. The tip portion 470 protrudes from a distal end of the base portion 460 in a direction that is generally perpendicular to the pin axis 480 such that the base and tip portions 460, 470 generally from an "L" or hook shape.

As shown in FIGS. 4, 5, and 7–9, the opening 440 in the motor cover 320 has a peripheral edge 500. In the illustrated embodiment, the opening 440 is generally rectangular in shape and is positioned on the motor cover 320 such that when the motor cover 320 is in the closed position, the pin 420 extends through the opening 440 (FIGS. 5 and 7–9). The tolerance between the opening 440 and the pin 420 is preferably relatively tight. Consequently, when the motor cover 320 is in the closed position, the base portion 460 of the pin 420 engages the peripheral edge 500 to discourage the motor cover 320 from moving relative to the frame 210 in a direction perpendicular to the pin axis 480.

When the knee of the rider 300 applies a force on the knee rest in a direction perpendicular to the pin axis 480, the force is transferred from the motor cover 320 to the frame portion 450 directly through the pin 420. In the illustrated embodiment, direct force transfer between the frame 210 and the motor cover 320 through the pin 420 only occurs at three of the four sides of the rectangularly shaped peripheral edge 500 (specifically the front, back, and top sides of the peripheral edge 500). Force transfer between the spaced lower side of the peripheral edge 500 and the pin 420 is less important because the rider 300 rarely applies an upwardly directed load to the motor cover 320. In an alternative embodiment of the present invention, the pin is cylindrically shaped and extends through a tightly toleranced round opening in the motor cover. The resulting pin axis is defined by the cylindrical pin's axis. Consequently, forces exerted on the motor cover 320 in any direction perpendicular to the pin axis would be transferred directly to the frame portion 450 through the pin.

As shown in FIG. 7, the latch 430 comprises three main portions: a base portion 510, a pin engaging portion 520, and a knob portion 530. The latch portions 510, 520, 530 are preferably integrally formed from a resilient material such as rubber. Consequently, the latch 430 defines a resilient portion 535 that connects between the base portion 510 and the pin engaging portion 520. Alternatively, one or more of the latch portions 510, 520, 530 may be separately formed and/or comprise a non-resilient material. For example, if the base portion 510 and the pin engaging portion 520 are separately formed and do not each comprise a resilient material, a resilient portion such as a mechanical spring or piece of rubber may connect the latch portions 510, 520 together.

The base portion 510 is mounted to the frame portion 450, preferably using bolts, screws, glue, or other fastener. The base portion 510 may alternatively be mounted to some other portion of the frame 210 without deviating from the scope of the present invention.

Figure 8:
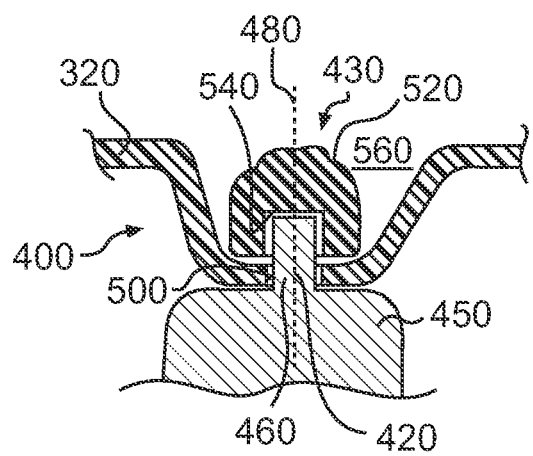
FIG. 8 is a cross-sectional view of the latch fastener shown in FIGS. 6 and 7, taken along the line 8—8 in FIGS. 6 and 7.
Figure 9:
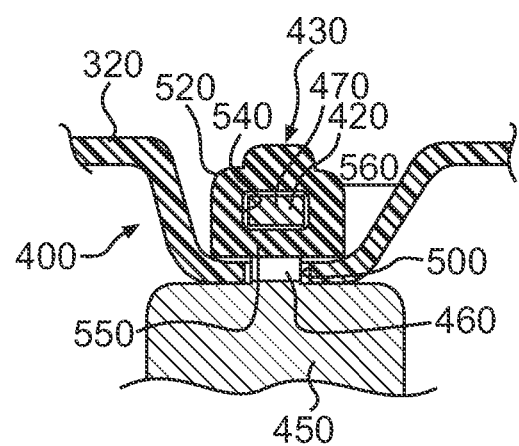
FIG. 9 is a cross-sectional view of the latch fastener shown in FIGS. 6 and 7, taken along the line 9—9 in FIGS. 6 and 7.

The pin engaging portion 520 extends distally from the base portion 510. As illustrated in FIGS. 7–9, a channel 540 is formed in the underside of the pin engaging portion 520. The channel 540 is shaped so that the tip portion 470 of the pin 420 can fit into the channel 540. A lip 550 is formed in a distal end of the channel 540 and is constructed and arranged to engage the tip portion 470 of the pin 420.

While the illustrated pin 420 and latch 430 include mating hook or lip portions, a variety of alternative latches and pins may be used instead. For example, the pin 420 could include a bulbous tip that fits into a slot with an enlarged opening in the latch 430. Alternatively, the pin 420 could be cylindrically shaped and have a notch formed near its tip that engages a lip or other notch in the latch 430.

Returning to the embodiment illustrated in FIG. 7, the knob portion 530 extends from the pin engaging portion 520. The knob portion 530 is preferably bulbous and may have frictional surface features that enable the snowmobile rider 300 to grasp and manipulate the latch 430 with his hand. Because the pin engaging portion 520 is resiliently connected to the base portion 510, the snowmobile rider 300 may use the knob portion 530 to stretch the resilient portion 535 and manipulate the pin engaging portion 520.

Figure 4:
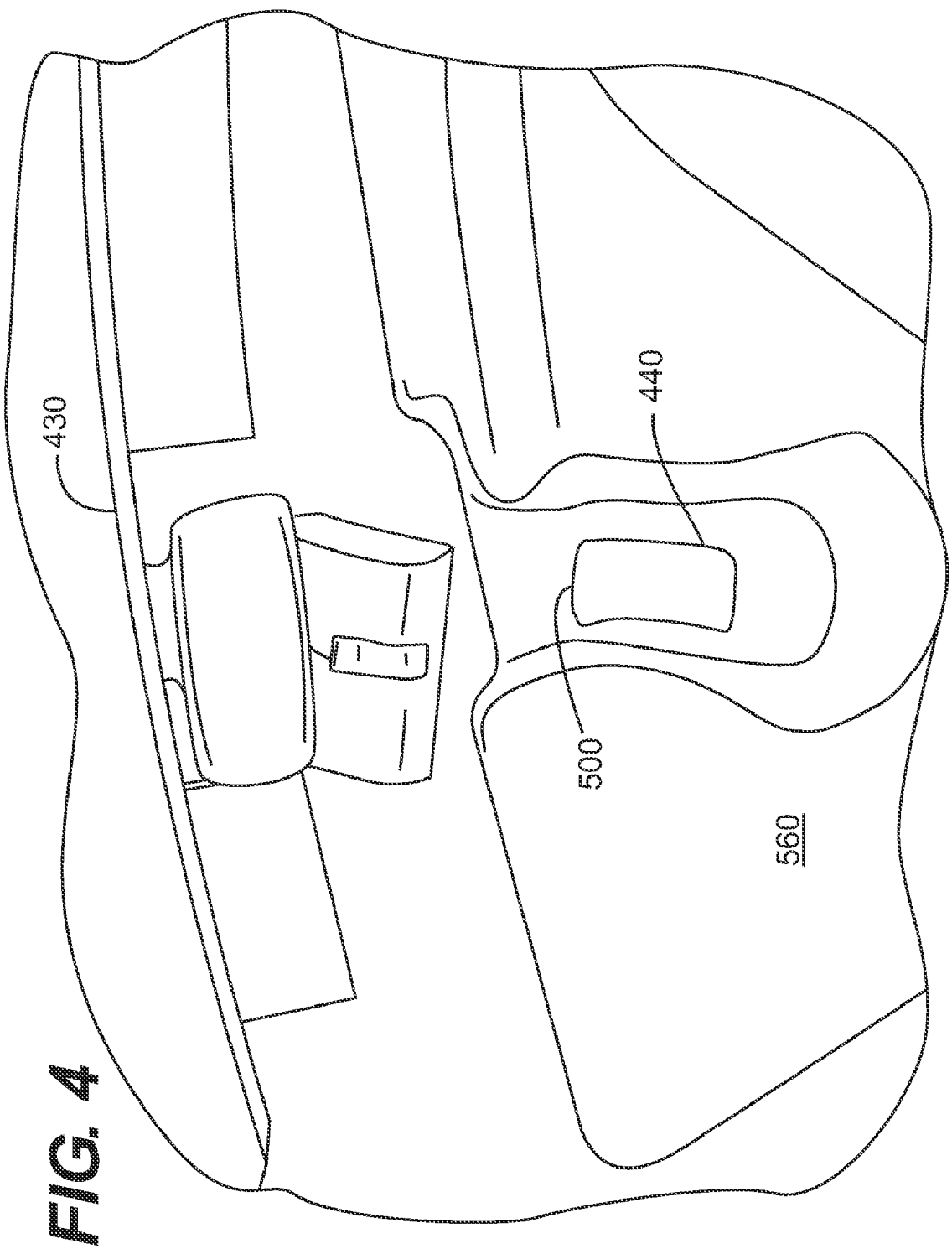
FIGS. 4–6 are partial side views of the snowmobile shown in FIG. 1 showing the sequential closure of the motor cover and engagement of a motor cover latch fastener.
Figure 5:
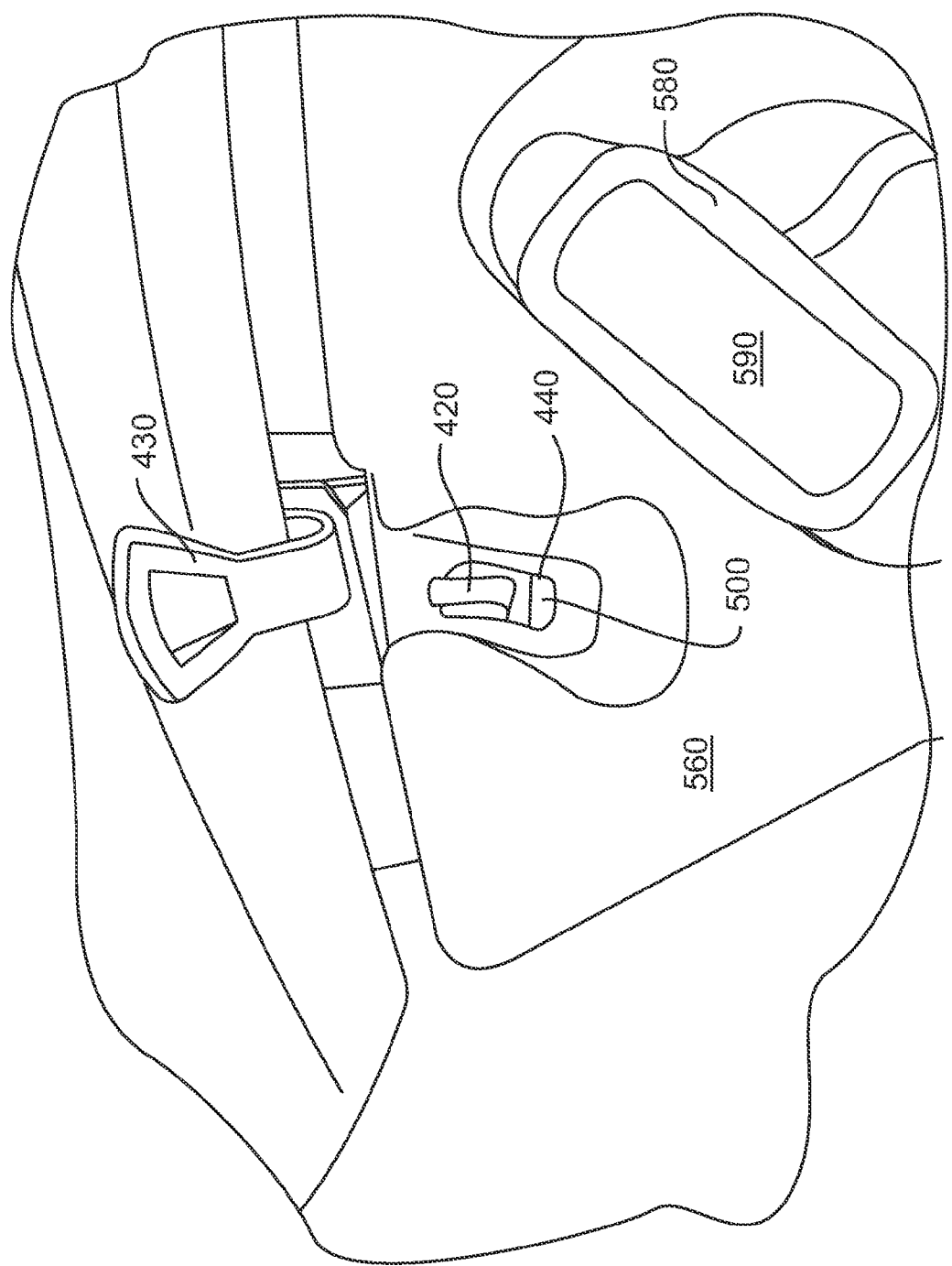
Figure 6:
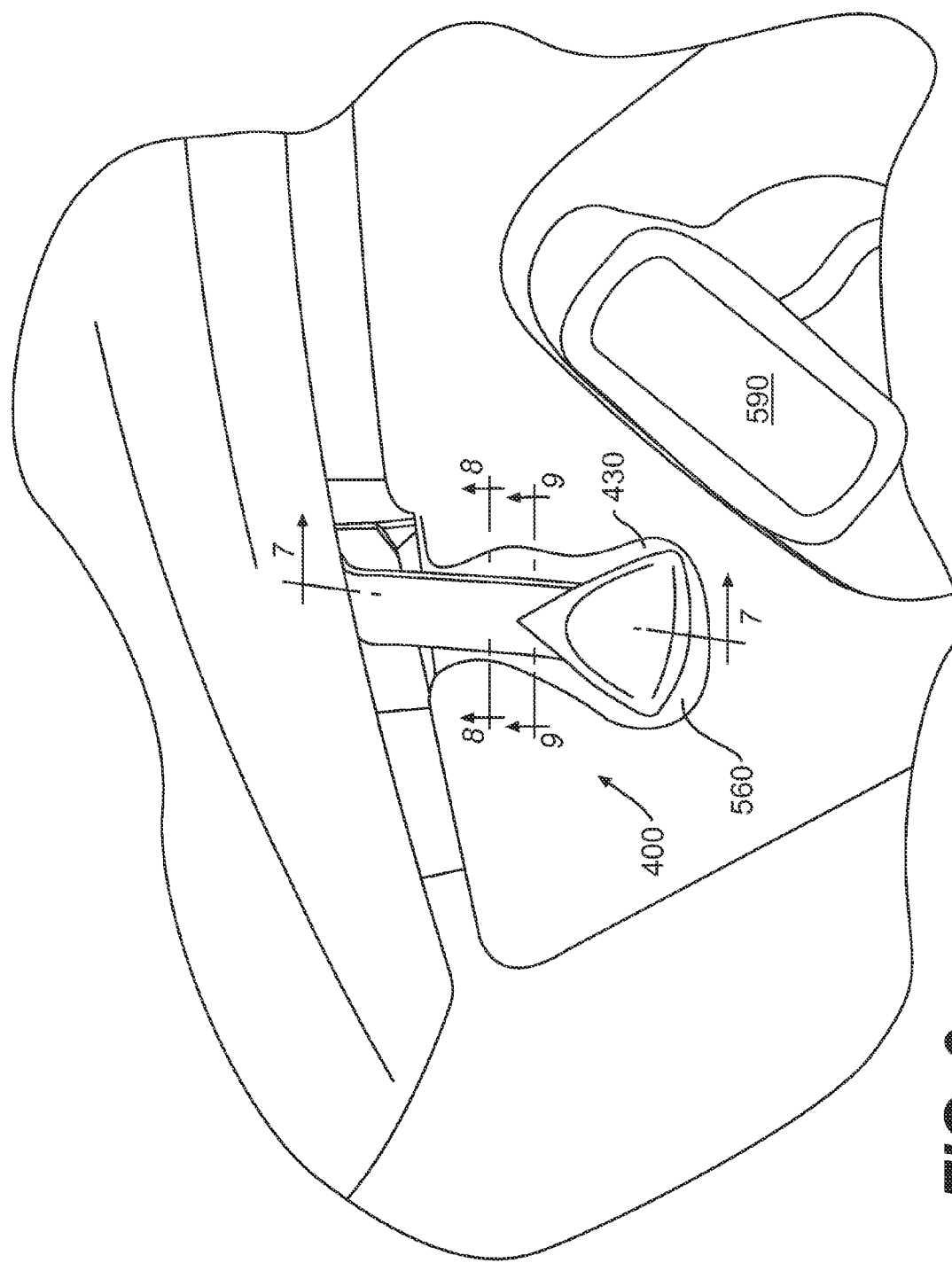

FIGS. 4–6 show the sequential closing of the motor cover 320 and engagement of the latch fastener 400. As shown in FIGS. 4 and 5, the rider 300 first pivots the motor cover 320 into its closed position. As illustrated in FIG. 5, the rider 300 next manipulates the knob portion 530 to stretch the resilient portion 535 and move the pin engaging portion 520 over the pin 420 until the tip portion 470 enters the channel 540 (FIG. 7). As shown in FIG. 6, the rider 300 then releases the knob portion 530 to allow the resilient portion 535 to pull the pin engaging portion 520 toward the base portion 510 and cause the lip 550 to engage the tip portion 470 (FIG. 7). The engagement between the tip portion 470 of the pin 420 and the lip 550 of the pin engaging portion 520 of the latch 430 discourages the latch 430 from disengaging the pin 420.

As illustrated in FIGS. 6–9, the motor cover 320 is securely clamped between the latch 430 and the frame portion 450 (or any other convenient frame element). Accordingly, the latch 430 discourages the motor cover 320 from moving in the direction of the pin axis 480 away from the frame portion 450. The direction of the pin axis 480 is also the opening direction of the motor cover 320 and is the main direction in which the pin 420 does not discourage the motor cover 320 from moving relative to the frame 210. In total, force components that are exerted on the motor cover 320 in a direction that is parallel to the pin axis 480 are transferred to the frame 210 through the latch 430, while force components that tend to move the motor cover 320 in a direction perpendicular to the pin axis 480 are transferred to the frame 210 through the pin 420.

As best shown in FIGS. 6–9, when the latch 430 engages the pin 420, the pin engaging portion 520 covers and encloses the tip portion 470 of the pin 420. By covering the L shape or hook shape of the pin 420, the latch 430 discourages clothing, debris, etc. from accidentally getting caught on the hook shape of the pin 420.

As illustrated in FIGS. 4–9, the motor cover 320 includes a recessed area 560 around the opening 440. The recessed area 560 is generally shaped and positioned such that the latch 430 fits therein when the latch 430 engages the pin 420. The recessed positioning of the latch 430 discourages the latch from being accidentally disengaged from the pin 420 during operation of the snowmobile 200. Furthermore, the recessed positioning also creates a smoother, more comfortable surface upon which the rider 300 can rest his inner legs.

The motor 230 is preferably an internal combustion engine that includes an electric starter (not shown). In case the electric starter fails, however (due to battery discharge, etc.), a rewind starter 570 (FIG. 3) is also provided. The rewind starter 570 includes a cord (not shown) and a handle 580 (FIGS. 2, 3, 5 and 6). As shown in FIGS. 2, 3, 5, and 6, an opening 590 is formed in the motor cover 320 to enable the rider 300 to access and use the handle 580 of the rewind starter 570 without opening the motor cover 320. The opening 590 is preferably defined by motor cover sides 600 that are recessed relative to an outer surface of the motor cover 320. When the rewind starter 570 is in its rewound position, the handle 580 preferably does not extend outwardly past the outer surface of the motor cover 320. Accordingly, the starter handle 580 does not interfere with the rider's comfortable use of the motor cover 320 as an inner leg support. While the rewind starter 570 and associated motor cover opening 590 are disposed on the right side of the illustrated snowmobile 200, the rewind starter 570 and opening 590 may alternatively be disposed on the left side of the snowmobile 200 or in any other convenient location of the left side of the snowmobile 200. Furthermore, the starter 570 and opening 590 may be omitted altogether without deviating from the scope of the present invention.

While preferred embodiments of the invention have been shown and described with reference to the accompanying figures, it is evident that variations and modifications are possible that are within the spirit and scope of the preferred embodiments described herein. In addition, while the latch fastener has been described with reference to use with a snowmobile, most if not all the features of the described latch fastener could be applied to other environments as well, such as for other vehicles, or for securing members that are movable with respect to one another.

What is claimed is:

1. A snowmobile, comprising:
  a frame;
  a motor supported by the frame;
  an endless drive track supported by the frame and operatively connected to the motor;
  a straddle type seat supported by the frame;
  two steering skis supported by the frame;
  a motor cover connected to the frame for relative pivotal movement about a motor cover axis between a closed position and an open position relative to the frame, the motor cover defining an opening therethrough with a peripheral edge;
  a pin rigidly mounted to the frame and positioned such that the pin extends through the opening when the motor cover is in the closed position; and
  a latch having a first portion mounted to the frame and a second portion selectively engageable with the pin, wherein the second portion holds the motor cover in the closed position,
  wherein, when the motor cover is in the closed position, the pin engages the peripheral edge of the opening to discourage the motor cover from moving relative to the frame.

2. The snowmobile of claim 1, wherein the latch includes a resilient portion connecting the first portion to the second portion.

3. The snowmobile of claim 2, wherein the pin comprises a first portion that extends outwardly from the frame and a second portion that protrudes from the first portion so that the first and second portions generally form an "L" shape.

4. The snowmobile of claim 3, wherein the second portion of the latch includes a lip that selectively engages the second portion of the pin.

5. The snowmobile of claim 4, wherein the latch further comprises a knob attached to the second portion, the knob being constructed and arranged to enable a rider to selectively engage the latch and pin by manipulating the knob so as to stretch the resilient portion of the latch and enable the lip of the latch to fit over the second portion of the pin.

6. The snowmobile of claim 1, wherein the motor cover includes a recessed area around the opening such that the second portion of the latch is disposed in the recessed area when the motor cover is closed and the latch engages the pin.

7. The snowmobile of claim 1, wherein the motor cover axis forms an angle with a vertically extending line that is less than 45 degrees.

8. The snowmobile of claim 7, wherein the angle is less than 30 degrees.

9. The snowmobile of claim 1, wherein the motor cover includes a knee rest that is constructed and arranged to engage one of the snowmobile rider's knees during operation of the snowmobile, the snowmobile being constructed and arranged to transfer forces exerted by the rider's knee on the motor cover to the frame through the pin.

10. The snowmobile of claim 1, wherein the latch encloses a distal end of the pin when the latch engages the pin.

11. The snowmobile of claim 1, further comprising a starter cord and handle operatively connected to the motor, wherein the motor cover includes a second opening therethrough, through which the handle extends when the motor cover is in the closed position.

12. The snowmobile of claim 1, wherein, when the motor cover is in the open position, the motor is exposed.

13. The snowmobile of claim 1, wherein:
  the pin extends outwardly from the frame in a direction that defines a pin axis, and
  when the motor cover is in the closed position, forces applied to the motor cover in a direction perpendicular to the pin axis are transferred to the frame through the pin.

* * * * *